Nov. 13, 1951 L. W. GORDON 2,574,916
AIRCRAFT CONTROL APPARATUS
Filed May 2, 1946 3 Sheets-Sheet 3

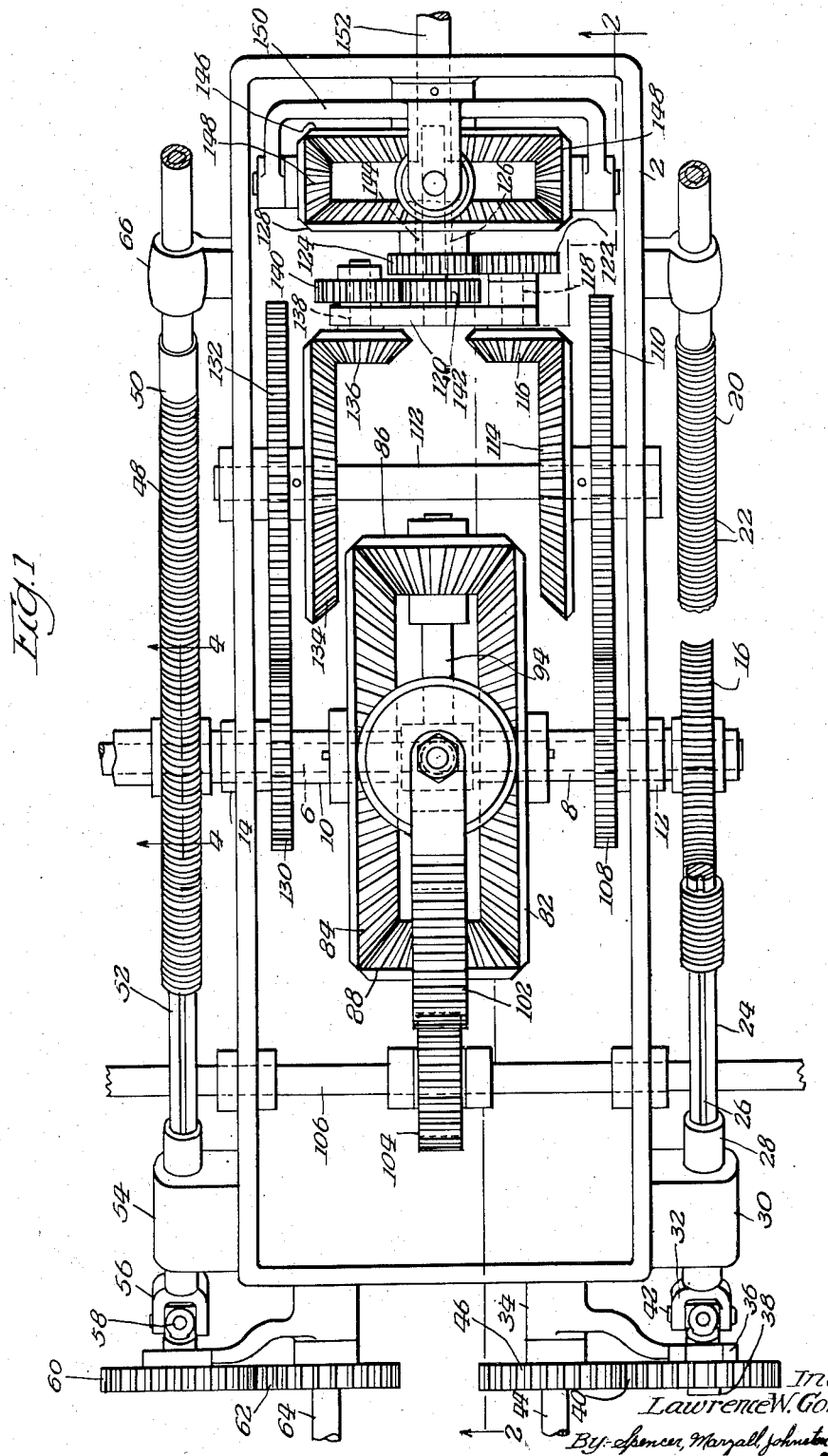

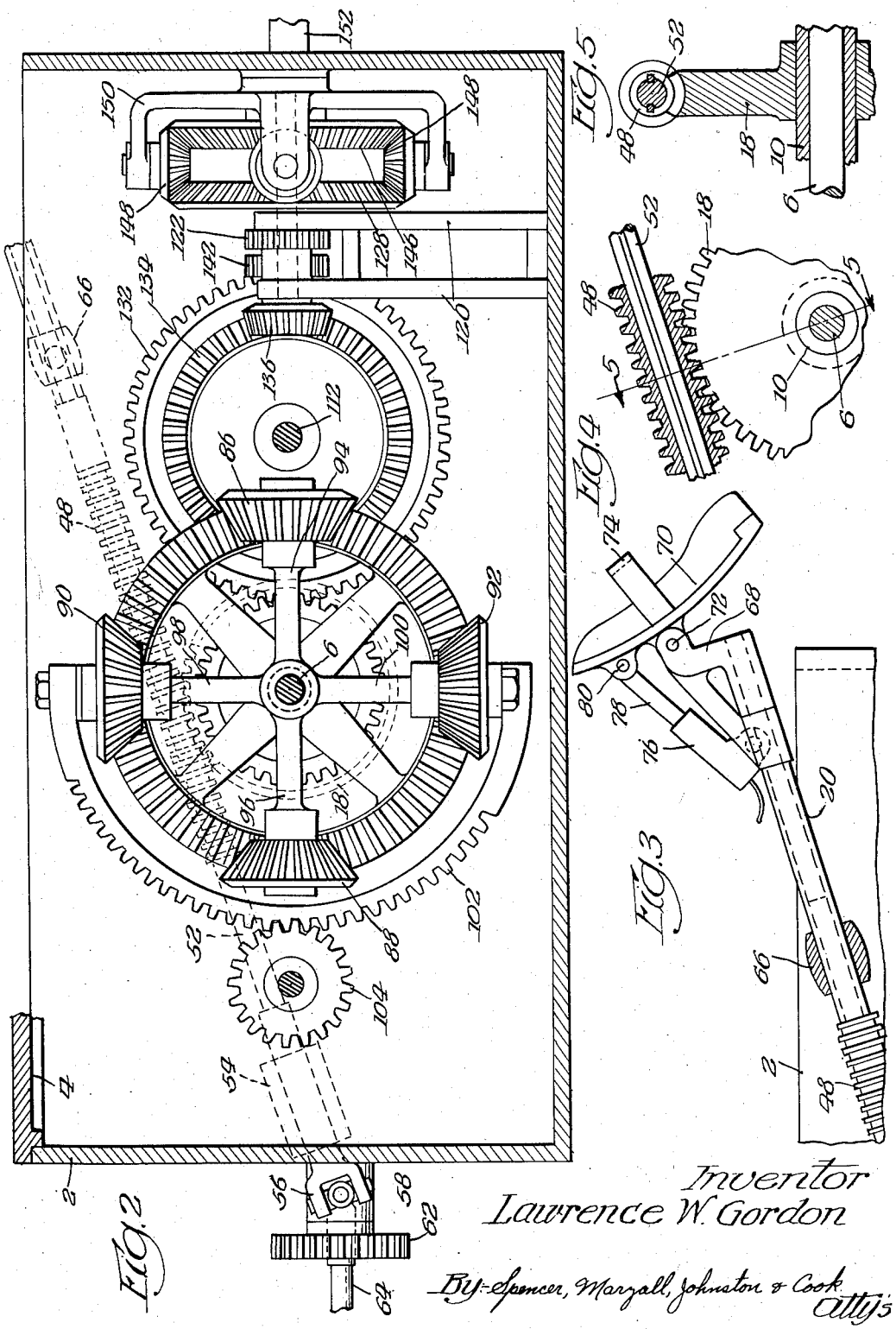

INVENTOR:
LAWRENCE W. GORDON

ATT'YS

Patented Nov. 13, 1951

2,574,916

UNITED STATES PATENT OFFICE 2,574,916

AIRCRAFT CONTROL APPARATUS

Lawrence Wright Gordon, Lancaster, Calif.

Application May 2, 1946, Serial No. 666,607

4 Claims. (Cl. 244—86)

This invention relates in general to aircraft control apparatus and is directed particularly to an apparatus for controlling the controllable elements of aircraft, such as the rudder, elevators and ailerons, solely by means of pedals.

Previous attempts have been made to incorporate into aircraft various types of apparatus whereby the plane can be controlled with the feet, leaving the pilot's hands free for other purposes. Such devices as have been suggested previously, however, have had certain disadvantages, the most common of which is that a pilot must be completely retrained in order to pilot the craft provided with such pedal operated devices.

Also, earlier attempts to meet this problem have been unable to produce an apparatus where all of the controllable elements can be operated by pedal devices. Usually at least one of the elements, either the rudder, the elevators or the ailerons, have had to be manipulated by hand. Furthermore, most of these earlier devices have not been too dependable because they have been controlled by lever arms and fulcrums rather than by positively operated means.

In my invention I overcome these various objections and have been able to provide an apparatus entirely governed by gear mechanism where movements of the controllable elements can all be made simultaneously, or independently, or any two of the elements can be combined. Also the movements required to maneuver the plane are very similar to those required in conventional aircraft and thus results in less conversion training for the pilot.

One of the principal objects of the present invention is, therefore, to provide an aircraft with pedal operated means to control the movements thereof.

Another object of the invention is to provide an aircraft with pedal operated means whereby any or all of the controllable elements which control the movements thereof can be controlled independently or simultaneously at the option of the pilot.

A further object of the invention is to provide an aircraft, having a rudder, elevators and ailerons, with pedal operated means which can be pedipulated to move or control any one, any two or all three of those elements at the option of the pilot.

Still another object of the invention is to provide pedal operated means in an aircraft to control the movements thereof through a gear train and a set of planetary gears connected to one of the controllable elements thereof, A still further object of the invention is to provide an aircraft with two independently operated pedals connected to controllable elements, such as the rudder, elevators and ailerons, in such a way that pedipulation of the pedals in one manner will move only one of those elements, pedipulation in a second manner will move only another of the elements, and in a third manner will move the third of the elements, or the pedals can be operated to move any two or all three of the elements simultaneously.

Another object of the invention is to provide pedal operated means for controlling the movements of an aircraft in which is also incorporated a braking mechanism which will operate the same as in conventional types of controls.

Other objects and advantages of the invention will be apparent by referring to the following description in conjunction with the accompanying drawings in which:

Fig. 1 is a plan view of the mechanism embodying my invention showing the gear box with the cover removed therefrom;

Fig. 2 is a vertical longitudinal section through the gear box taken substantially along the plane of line 2—2 of Fig. 1 showing a part of the mechanism in side elevation;

Fig. 3 is a fragmentary side elevation showing one of the pedals and its connecting parts;

Fig. 4 is an enlarged fragmentary vertical section taken substantially along the plane of line 4—4 of Fig. 1;

Fig. 5 is a detailed section taken substantially along the plane of line 5—5 of Fig. 4.

Figure 6:
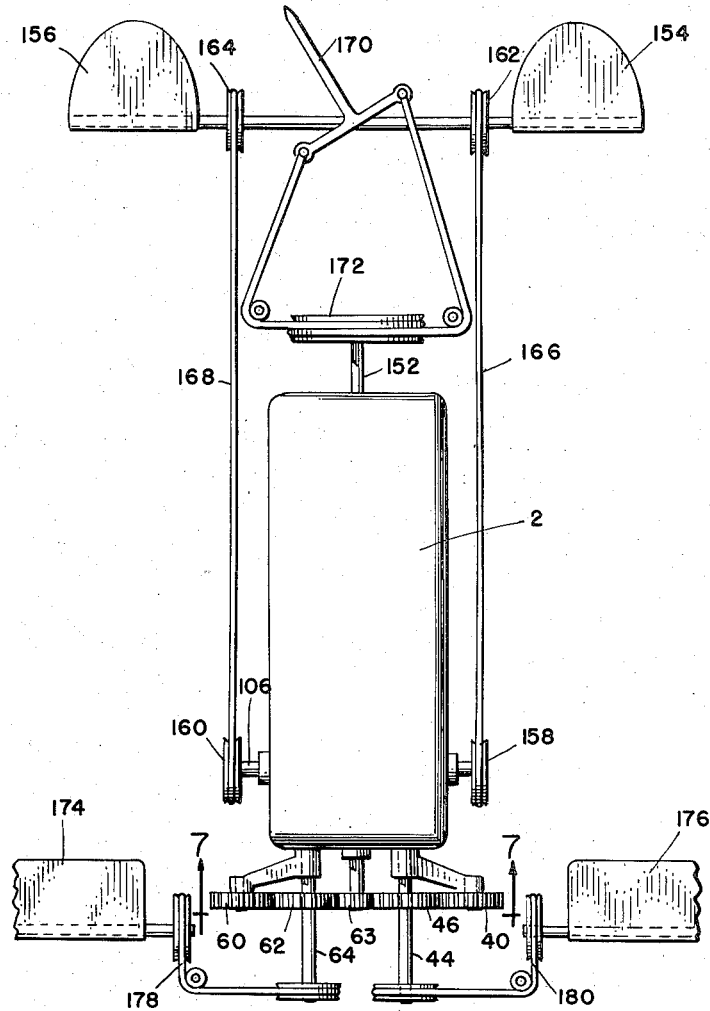
Fig. 6 is a diagrammatic view of the apparatus showing the control surfaces in relation to the apparatus.

Briefly stated, my invention embodies the use of two gear trains, each of which is connected to a pedal in the cockpit of the plane. A planetary gear unit is disposed at one end of the two gear trains, which unit includes two sun gears and a plurality of planetary gears in mesh therewith. One gear train is connected to one of the sun gears and the other gear train to the other sun gear. The planetary gears are all mounted on a rotatable support connected to one of the controllable elements, and which, in the embodiment of the invention shown, is the rudder.

A second planetary gear unit is also mounted so as to be actuated by operation of the pedals and is adapted to control the elevators. The ailerons are connected indirectly to the shaft on which each pedal is mounted. The connections between the pedals and the various controllable units is such, in the form of the invention illustrated, that when both pedals are pushed or pulled simultaneously, the sun gears of the planetary gear unit connected to the elevators will rotate in the same direction, thus carrying with them the planetary gears and move the elevators. At the same time simultaneous pushing or pulling of the pedals will rotate the sun gears of the planetary gear unit connected to the rudder in opposite directions at equal speeds of rotation, whereby the planetary gears in mesh therewith will rotate but will not revolve, and therefore will cause no movement of the rudder. The ailerons are actuated by pivoting the pedals to the right or left so as to rotate the shaft on which each is mounted.

Referring now more particularly to the drawings, the details of the invention may be seen in Figs. 1 and 2 where I provide a gear box 2 normally having a cover 4 thereon. Within the gear box I provide a transversely extending shaft 6 between the sides of the gear box at each end of which is provided rotatable sleeves 8 and 10. These sleeves support the shaft 6 and are themselves mounted in bearings 12 and 14 respectively.

At one side of the gear box a gear 16 is mounted on the sleeve 8, having a concave toothed periphery. At the opposite side of the gear box a similar gear 18 is mounted on the sleeve 10.

An elongated tubular member 20 at one side of the gear box is provided with annular teeth, or grooves 22 so as to mesh with the gear 16, causing rotation of the gear when the tube 20 is axially reciprocated. The tube 20 is mounted for longitudinal movement on a rod 24 which is splined as at 26 and thus connected to tubular member 20. It will thus be seen that when the tube 20 is reciprocated axially it will slide on the rod 24 causing rotation of the gear 16, but if it is rotated it will cause no movement of the gear 16, but will impart a rotary movement to the shaft or rod 24 by reason of the splined connection 26. The lower end of the rod 24 passes through bearings 28 in a support 30, and is bifurcated at its lower end as at 32.

A support 34 is secured to one end of the gear box and extends outwardly so as to terminate in a bearing 36, which supports a stub shaft 38 on which is mounted a gear 40. The other end of the shaft 38 is secured within the bifurcated end 32 of the rod 24 by means of the pins 42 to thereby provide a universal joint. The support 34 also has mounted thereon a shaft 44 having a gear 46 mounted thereon and in mesh with the gear 40. Any suitable means may be used to connect the rod 44 to one of the ailerons, such means being conventional and not shown here.

At the opposite side of the gear box a similar arrangement is provided where the tubular member 48 has circular teeth 50 thereon and is mounted on the rod 52. The bearing member 54 supports the lower end of the rod which terminates in the bifurcated portion 56 and forms a similar universal joint 58 and likewise supports the gear 60 in mesh with the gear 62 on the shaft 64. Splines on the rod 52 and within the tube 48 will cause rotation of the rod when the tube is rotated and, by means of the universal joint 58, will cause rotation of the gear 60 in mesh with the gear 62 which, in turn, is mounted on the shaft 64 connected to the other aileron.

Figure 7:
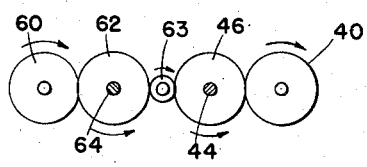
Fig. 7 is an elevational view of the aileron control gears taken along the lines 7—7 of Fig. 6.

It may be desirable to connect the gears 46 and 62 by means of a gear 63, as shown in Fig. 7, so that both pedals will work in unison for control of the ailerons.

Referring momentarily to Fig. 3 which shows the pedal construction and its connection to the tubular member 20, or 48, it will be seen that this member 20 is supported in a bracket 66 and at its upper end, which extends beyond the gear box, has an upturned portion 68 to which the pedal 70 is pivoted at 72. The pedal is provided with a strap 74 so that the pilot can exert a pull on the pedal when desired.

One of the advantage of this construction is that the conventional brake mechanism can be applied thereto. That is, the cylinder 76 is secured directly to the tubular member and has a piston 78 slidable therein, which piston is pivotally mounted to the under side of the pedal 70 at the toe portion thereof as at 80. By pivoting the pedal about the pivot point 72 the piston 78 will be actuated to apply the brakes in the conventional and well known manner. The construction of the pedal and its attachment to the toothed tubular member is identical at both sides of the gear box so that a description of one will suffice for both. It will be noted that either a downward push or an upward pull of either or both pedals will rotate either or both of the gears 16, or 18, with which the tubular members are in mesh, and that a rotation of either or both pedals about an axis in the same plane as that of the tubular member connected therewith will actuate the aileron connected thereto through the means above described.

The mechanism which is operated to actuate or control another of the controllable elements, in this case the elevators, includes a planetary gear arrangement to be actuated upon a pushing or pulling of both pedals simultaneously. At the inner end of the sleeve 8, a bevel gear 82 is mounted and a similar bevel gear 84 is mounted for rotation at the inner end of sleeve 10. These represent the sun gears of the planetary unit. Between these two gears are the planetary gears 86, 88, 90 and 92, each in mesh with the two sun gears 82 and 84. The planetary gears are mounted on a spider arrangement consisting of the four shafts 94, 96, 98 and 100, which are mounted 90° apart at the center of the shaft 6.

Shafts 98 and 100 extend beyond the respective planetary gears 90 and 92, and support the ends of a semi-circular rack 102 which is adapted to be in mesh with a pinion 104 secured to the shaft 106. This latter shaft extends beyond the sides of the gear box and has secured to the ends thereof any suitable means adapted to actuate the elevators when the shaft is rotated. Such means are well known in the art, and are not shown here. As stated hereinbefore, a pushing or pulling of the pedals 70 will reciprocate the toothed tubular members 20 and 48 to rotate the gears 16 and 18. These gears also being mounted on the sleeves 8 and 10 respectively, will cause rotation thereof together with the respective sun gears 82 and 84 mounted thereon. It will be clear that when the two gears 82 and 84 are rotated in opposite directions at equal speeds of rotation the planetary gears, while they will rotate about their own axes, will remain stationary as far as the shaft 6 is concerned, and will not revolve about that shaft. When the planetary gears remain stationary with respect to the shaft 6, there will be no movement of either the rack 102 or the gear 104, and thus no movement of the elevators. This occurs when one pedal is pushed downwardly and the other is pulled upwardly.

If, however, both pedals are operated in the same way simultaneously, that is to say if they are both pressed downwardly or pulled upwardly at the same time, then the sun gears 82 and 84 will both rotate in the same direction and force the planetary gears to revolve about shaft 6 as an axis, thus causing the entire gear unit to rotate. When this occurs the revolution of the planetary gears 90 and 92 will cause a rotation in either direction of the semi-circular rack 102 and the pinion 104 in mesh therewith, which in turn will cause a rotation of the shaft 106 and the elevator control means connected thereto. It will be clear that this planetary gear unit may take a form other than bevel gears as shown, such gears being merely illustrative of the preferred embodiment of the invention.

To actuate the third controllable element, in this case the rudder, I provide a gear train at each side of the gear box, each adapted to be operated independently of the other, and each of which terminates in a similar planetary gear unit at one end thereof. At one side of the apparatus the gear train consists of a pinion 108 mounted on the sleeve 8 in mesh with the gear 110 mounted on and secured to a shaft 112 which extends between the sides of the gear box and is journalled therein. A bevel gear 114 is also mounted on the shaft 112 adjacent the gear 110 and has in mesh therewith the bevel gear 116 having a shaft 118 journalled in a supporting bearing 120. The shaft 118 has a spur gear 122 mounted on the end thereof in mesh with a similar spur gear 124 mounted on the large tubular shaft or sleeve 126, which is also supported in the bearing 120 and through which another shaft, to be later described, passes. The bevel gear 128 is mounted on the end of shaft 126 and forms one of the sun gears of the planetary unit which controls the rudder. It will thus be seen that a rotation of gear 116 by reciprocation of the tube 20 will rotate the bevel gear 128 through the gear train just described.

At the opposite side of the apparatus a similar gear train is located and is adapted to be actuated by operation of the pedal which reciprocates the tube 48. This gear train consists of the pinion 130 mounted on the sleeve 10 in mesh with the gear 132 mounted on the shaft 112 adjacent which the bevel gear 134 is located also on the shaft 112 and is in mesh with the bevel gear 136. This latter gear is mounted at one end of the shaft 138 supported in the bearing 120, and carries the gear 140 in mesh with the gear 142 mounted on the shaft 144 which passes through the sleeve 126 and has the other sun gear 146 mounted at the end thereof. It will thus be seen that the bevel gear 146 will be rotated through the gear train by operation of the pedal connected to the tube 48.

The planetary gears 148 are four in number and are in mesh with both of the sun gears 128 and 146. These planetary gears are mounted on a frame 150 which is secured to the shaft 152, which in turn is connected by the customary means to the rudder, so that a rotation of the shaft 152 will actuate the rudder and thus be controlled by operation of the pedals.

By following through the direction of rotation of the various gears in each of the gear trains, it will be evident that when both of the pedals are either pushed downwardly or pulled upwardly simultaneously, the bevel gears 128 and 146 will rotate in opposite directions to thus cause rotation of the planetary gears 148, but will not permit them to revolve so that the shaft 152 will remain stationary. If, however, one of the pedals is pushed downwardly and the other is pulled upwardly simultaneously, these two sun gears 128 and 146 will be caused to rotate in the same direction and will thus cause the planetary gears to revolve and the shaft 152 to rotate by reason of the connection thereto of the frame 150.

I have explained above that the simultaneous pushing or pulling of both pedals would actuate the elevators through the planetary gear unit which includes the sun gears 82 and 84. It will also be clear that when this operation of the pedals takes place, the rudder will remain stationary because the gears 128 and 146 will rotate in opposite directions at the same rate of speed to prevent the planetary gears 148 from revolving about the shaft 152 as an axis. It will likewise be clear that as one of the pedals is pushed downwardly while the other is pulled upwardly, the first planetary gear unit operating the elevators will remain stationary since the two sun gears 82 and 84 will rotate in opposite directions. This operation of the pedals, however, will cause the rudder to move because it will cause a rotation of the gears 128 and 146 in the same direction.

Furthermore, the actuation of the ailerons may be caused in combination with either of these pedal movements if either one or both pedals are rotated each about its own axis causing a rotation of the rods 24 and 52.

It will thus be clear that either the ailerons, the elevators, or the rudder can be operated without actuating either of the other elements. Also, movement of the ailerons can take place simultaneously with movement of either the elevators or the rudder. If it is desired to operate the elevators and rudder together, it is merely necessary to operate one of the pedals only, while the other remains stationary. For example, supposing the pedal connected to the tube 20 is depressed and the other pedal is held stationary. This will cause not only a rotation of the sun gear 82 and a revolving of the planetary gears 86, 88, 90 and 92 connected thereto, because the gear 84 remains stationary, but will also rotate the sun gear 128 and cause the planetary gears to revolve because the other sun gear 146 remains stationary. If this movement is combined with a turning of the pedal about its own axis, one of the ailerons will be actuated. Thus it will be seen that not only each of the controllable elements can be actuated individually, but any two or all three thereof can be actuated simultaneously at the option of the pilot.

In Fig. 6 the complete control apparatus is illustrated diagrammatically. The housing 2 encloses the gear arrangements which operate the elevators 154 and 156 through the shaft 106, the pulleys 158, 160, 162 and 164 and the belts or wire ropes 166 and 168. The rudder 170 is operated by the shaft 152 and the assembly 172. The ailerons 174 and 176 are actuated by their respective pulley arrangements 178 and 180 and the drive shafts 64 and 44.

Thus all maneuvering of the plane can be done solely by correct operation of the pedals, leaving the hands of the pilot free for other duties. One of the distinct advantages of this construction is the fact that all of the controls and movements of the feet are similar to those in conventional aircraft, so that very little conversion training is necessary for a pilot to learn to control the plane by the use of my invention. It will be clear to those skilled in the art that other specific mechanism than that disclosed herein can be used without in any way departing from the spirit of the invention or sacrificing any of the attendant advantages. For example, the specific form of gear train may be modified and the particular type of planetary gear units shown herein may take any other suitable form provided, however, that the principle of the invention and the spirit thereof be retained.

Having thus described my invention what I claim as new and desire to secure by Letters Patent of the United States is:

1. In an aircraft having ailerons, elevators and a rudder, two pedals mounted for rotation and independent reciprocation, means connecting said pedals with the ailerons whereby rotation of either or both of said pedals will actuate the ailerons, and means connecting said pedals with the elevators and rudder in such a way that simultaneous movement of the pedals in the same direction will actuate the elevators only, and simultaneous movement of the pedals in opposite directions will actuate the rudder only.

2. In an aircraft having ailerons, elevators and a rudder, two pedals mounted for rotation and independent reciprocation, a tubular member having annular grooves therein connected to each pedal and adapted to rotate and reciprocate therewith, means connected between said tubular members and the ailerons whereby rotation thereof will actuate the ailerons, and gear means connecting said tubular members with the elevators and rudder whereby simultaneous reciprocation of said pedals and tubular members in a predetermined manner will actuate either the elevators or rudder only.

3. In an aircraft having controllable elements to control the movements thereof, two pedals mounted for rotation and independent reciprocation, two tubular members, each one connected to a pedal and adapted to rotate and reciprocate therewith, a rod within each tubular member and so connected thereto as to rotate therewith, but permit said member to slide longitudinally thereon, and means connecting each of said rods with one of said controllable elements whereby rotation of said rod will actuate the element connected thereto.

4. In an aircraft having controllable elements to control the flight thereof, two pedals mounted for rotation and reciprocation, two tubular members each having annular grooves thereon and each member connected to a pedal and adapted to be rotated and reciprocated therewith, a pinion in mesh with the grooves on each of said tubular members and adapted to be rotated when said pedals are reciprocated, gear means operatively associated with said pinions and operable upon rotation of said pinions to control at least one of said controllable elements, and gear means operatively associated with said pedals and tubular members and operable upon rotation of said pedals and tubular members connected therewith to control the aileron portion of said controllable elements.

LAWRENCE WRIGHT GORDON.

REFERENCES CITED

The following references are of record in the file of this patent:

UNITED STATES PATENTS

| Number | Name | Date |
|---|---|---|
| 1,371,815 | Rose | Mar. 15, 1921 |
| 1,576,079 | Barlow | Mar. 9, 1926 |
| 1,813,468 | Snyer | July 7, 1931 |
| 1,844,607 | Sikorsky | Feb. 9, 1932 |
| 1,864,329 | Volk | June 21, 1932 |
| 2,005,061 | Thomas | June 18, 1935 |
| 2,020,440 | Stein | Nov. 12, 1935 |
| 2,048,448 | Hoper | July 21, 1936 |
| 2,209,144 | Vogt | July 23, 1940 |

FOREIGN PATENTS

| Number | Country | Date |
|---|---|---|
| 20,049 | Great Britain | of 1911 |
| 442,952 | Germany | Apr. 12, 1927 |